(12) United States Patent
Ono et al.

(10) Patent No.: US 9,902,645 B2
(45) Date of Patent: Feb. 27, 2018

(54) NON-ALKALI GLASS

(71) Applicant: ASAHI GLASS COMPANY, LIMITED, Chiyoda-ku (JP)

(72) Inventors: Kazutaka Ono, Tokyo (JP); Hirofumi Tokunaga, Tokyo (JP); Jun Akiyama, Tokyo (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 0 days.

(21) Appl. No.: 15/490,403

(22) Filed: Apr. 18, 2017

(65) Prior Publication Data

US 2017/0217826 A1 Aug. 3, 2017

Related U.S. Application Data

(63) Continuation of application No. PCT/JP2015/080000, filed on Oct. 23, 2015.

(30) Foreign Application Priority Data

Oct. 23, 2014 (JP) ................ 2014-216174

(51) Int. Cl.
*C03C 3/091* (2006.01)
*G02F 1/1333* (2006.01)

(52) U.S. Cl.
CPC ............ *C03C 3/091* (2013.01); *G02F 1/1333* (2013.01); *G02F 2001/133302* (2013.01); *G02F 2202/09* (2013.01)

(58) Field of Classification Search
CPC .................................................... C03C 3/091
See application file for complete search history.

(56) References Cited

U.S. PATENT DOCUMENTS

| | | | |
|---|---|---|---|
| 5,116,789 A | 5/1992 | Dumbaugh, Jr. et al. | |
| 5,244,847 A | 9/1993 | Kushitani et al. | |
| 6,069,100 A | 5/2000 | Naumann et al. | |
| 6,373,193 B1 | 4/2002 | Marlor et al. | |
| 2004/0070327 A1* | 4/2004 | Bergmann | C03C 3/087 313/317 |
| 2005/0099128 A1 | 5/2005 | Bergmann et al. | |

FOREIGN PATENT DOCUMENTS

| | | |
|---|---|---|
| JP | 4-325435 | 11/1992 |
| JP | 5-232458 | 9/1993 |
| JP | 9-263421 | 10/1997 |
| JP | 2001-516952 | 10/2001 |

OTHER PUBLICATIONS

International Search Report dated Jan. 26, 2016 in PCT/JP2015/080000 filed on Oct. 23, 2015 (with English translation).
Written Opinion dated Jan. 26, 2016 in PCT/JP2015/080000 filed on Oct. 23, 2015.

* cited by examiner

*Primary Examiner* — Elizabeth A. Bolden
(74) *Attorney, Agent, or Firm* — Oblon, McClelland, Maier & Neustadt, L.L.P.

(57) ABSTRACT

Provided is a non-alkali glass having a strain point of 680° C. or higher, having an average thermal expansion coefficient of from $30 \times 10^{-7}/°$ C. to $45 \times 10^{-7}/°$ C. at from 50° C. to 350° C., containing, indicated by mass % on the basis of oxides: $SiO_2$: 54% to 66%, $Al_2O_3$: 10% to 27%, $B_2O_3$: 0.2% to 5.5%, MgO: 0% to 10%, CaO: 0% to 15%, SrO: 0% to 15%, BaO: 0% to 15%, and MgO+CaO+SrO+BaO: 8% to 25%, containing 600 mass ppm or less of $Na_2O$, and satisfying a mass ratio ($Na_2O/B_2O_3$) between $Na_2O$ and $B_2O_3$ being from 0.001 to 0.3.

18 Claims, 3 Drawing Sheets

NON-ALKALI GLASS

TECHNICAL FIELD

The present invention relates to a non-alkali glass which is suitable as a substrate glass for various displays and a substrate glass for a photomask, does not substantially contain alkali metal oxide, and is capable of performing float processing. In the present specification, being referred to as "non-alkali" means that the content of alkali metal oxide ($Li_2O$, $Na_2O$, and $K_2O$) is 1,000 mass ppm or less.

BACKGROUND ART

Conventionally, a substrate glass for various displays, particularly, those for depositing a metal or oxide thin film and the like on the surface has been required to have the following characteristics.
(1) Having a very low content of alkali metal oxide, specifically, having a content of alkali metal oxide of 1,000 mass ppm or less, because, if alkali metal oxide is contained, alkali metal ions diffuse in a thin film to deteriorate film characteristics.
(2) Having small deformation of a glass substrate due to heating in a thin-film deposition process, particularly, having small thermal shrinkage; that is, having a small thermal shrinkage rate.
(3) Having sufficient chemical durability against various chemicals used in semiconductor formation; in particular, having durability against buffered hydrofluoric acid (BHF: mixed liquid of hydrofluoric acid and ammonium fluoride) for etching $SiO_x$ or $SiN_x$, against a chemical solution containing hydrochloric acid used for etching of ITO, against various acids (nitric acid, sulfuric acid, etc.) used for etching of an metal electrode, and against an alkaline of a resist removing liquid.
(4) Having no defects (bubbles, striae, inclusions, pits, flaws, etc.) in the inside and on the surface.

In addition to the above requirements, the recent situations are as follows.
(5) Reduction in weight of a display is required, and the glass itself is also required to be a glass having a small density.
(6) Reduction in weight of a display is required, and a decrease in thickness of the substrate glass is desired.
(7) In addition to conventional amorphous silicon (a-Si) type liquid crystal displays, polycrystal silicon (p-Si) type liquid crystal displays requiring a slightly high heat treatment temperature have come to be produced (a-Si: about 350° C.; p-Si: 350° C. to 550° C.).
(8) In order to improve productivity and increase thermal shock resistance by increasing the rate of rising and falling temperature in heat treatment for manufacturing a liquid crystal display, a glass having a small average thermal expansion coefficient is required.

Meanwhile, drying in etching has been progressed, and a requirement for BHF resistance has been reduced. As the conventional glass, in order to improve BHF resistance, a glass containing from 6 to 10 mol % of $B_2O_3$ has been largely used. However, $B_2O_3$ has a tendency of reducing strain point. Example of a non-alkali glass which does not contain $B_2O_3$ or has a small content include the followings.

Patent Document 1 discloses a glass which contains from 0 to 3 weight % of $B_2O_3$. However, the strain point in Examples is 690° C. or lower.

Patent Document 2 discloses a glass which contains from 0 to 5 mol % of $B_2O_3$. However, the average thermal expansion coefficient at from 50° C. to 350° C. is more than $50 \times 10^{-7}$/° C.

In order to solve the problem in the glasses disclosed in Patent Documents 1 and 2, a non-alkali glass disclosed in Patent Document 3 has been proposed. The non-alkali glass disclosed in Patent Document 3 has a high strain point, is capable of being formed by a float method, and is suitable for a use of a substrate for a display, a substrate for a photo mask and the like.

PRIOR ART DOCUMENTS

Patent Documents

Patent Document 1: JP-A-H04-325435
Patent Document 2: JP-A-H05-232458
Patent Document 3: JP-A-H09-263421

SUMMARY OF THE INVENTION

Problems that the Invention is to Solve

Recently, in a high-definition and small display such as a portable terminal such as a smart phone, a method using laser annealing is employed as a method of manufacturing a high-quality p-Si TFT. However, in order to improve the value of goods, higher definition is desired, and thus a glass having a smaller thermal shrinkage rate is required. On the other hand, from a request in a glass manufacturing process, particularly, in float processing, it is required that viscous properties of a glass, particularly a temperature $T_4$ at which glass viscosity reaches to $10^4$ dPa·s, and a devitrification temperature are reduced, and that the strain point is not excessively raised.

As described above, a non-alkali glass used as a substrate glass for various displays or a substrate glass for a photo mask is required to have a more-reduced thermal shrinkage rate. For this, it is effective that the main component configuration of the glass is changed so as to increase the strain point or a cooling rate of the glass is reduced. However, in the case where the thermal shrinkage rate in thermal treatment at 600° C. for 80 minutes reaches, as a result, a level of 50 ppm or lower, an influence of various impurities in the glass cannot be ignored.

In particular, an alkali component ($R_2O$: R indicates alkali metal element such as Li, Na, K, etc.) which is unavoidably mixed in from a raw material moves fast in a glass structure and thus, has an large influence on the thermal shrinkage rate. In particular, in a glass containing a $B_2O_3$ component, an alkali component influences the coordination number of boron, and causes a change of the glass structure. Thus, a content ratio (ratio of $R_2O/B_2O_3$) between the alkali component and the $B_2O_3$ component is an important parameter. However, in the conventional non-alkali glass, the $R_2O/B_2O_3$ ratio is not handled importantly. In addition, because the $B_2O_3$ content was high, even in the case where, for example, the alkali component is contained in an amount of 0.1 wt % (1,000 ppm), which is considered as being preferable as an upper limit in a non-alkali glass, $R_2O/B_2O_3$ was about 0.02 or smaller.

If the amount of $B_2O_3$ is reduced in order to obtain a low thermal shrinkage glass, it is required to reduce more the amount of the alkali component in order to reduce the ratio. In order to reduce the alkali component significantly, a raw material having very high purity may be used. However, if such a raw material having high purity is used, cost may be increased, which is not preferable. On the other hand, the alkali component functions as a flux and thus improves initial meltability of the raw materials. Thus, if the amount of the alkali component is reduced too much, defects may occur and the quality may be degraded.

In addition, the alkali component is impurities, and thus management for the alkali component is difficult. Accordingly, if fluctuation occurs, there is a high probability of variation in the thermal shrinkage rate occurring among lots. In consideration of the high definition in the recent displays, variation among lots has a risk of increasing a defect rate in a panel manufacturing process, and thus is very concerned.

In order to solve the above problems, an object of the present invention, in a glass having a low thermal shrinkage rate, is to provide a non-alkali glass which hardly causes problems by BHF, has high productivity, and has a low thermal shrinkage rate.

Means for Solving the Problems

The present invention provides a non-alkali glass having a strain point of 680° C. or higher, having an average thermal expansion coefficient of from $30\times10^{-7}$/° C. to $45\times10^{-7}$/° C. at from 50° C. to 350° C., and containing, indicated by mass % on the basis of oxides:

$SiO_2$: 54% to 66%
$Al_2O_3$: 10% to 27%
$B_2O_3$: 0.2% to 5.5%
MgO: 0% to 10%
CaO: 0% to 15%
SrO: 0% to 15%
BaO: 0% to 15%
MgO+CaO+SrO+BaO: 8% to 25%, containing 600 mass ppm or less of $Na_2O$, and satisfying a mass ratio ($Na_2O/B_2O_3$) between $Na_2O$ and $B_2O_3$ being from 0.001 to 0.3.

Advantageous Effects of the Invention

The non-alkali glass according to the present invention is particularly suitable for a substrate for a display, a substrate for a photomask and the like which are used for a purpose requiring a small thermal shrinkage rate, and is a glass for easily performing float processing. The non-alkali glass according to the present invention can also be used as a glass substrate for a magnetic disk.

In addition, because fluctuation in the thermal shrinkage rate occurring due to the content of $Na_2O$ occupying a large part of alkali metal oxides which are unavoidably mixed in from raw materials is small, a probability of variation of the thermal shrinkage rate occurring among lots is suppressed. Thus, it can be described that the defect rate in a panel manufacturing process is reduced.

MODE FOR CARRYING OUT THE INVENTION

Figure 1:
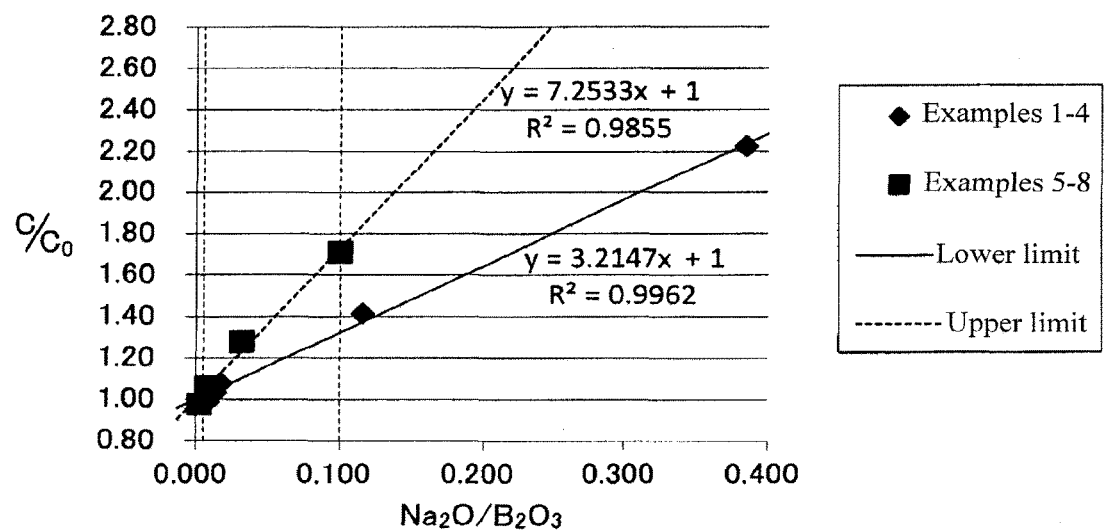
FIG. 1 is a graph obtained by comparing a relationship of $Na_2O/B_2O_3$ and $C/C_0$.

Next, a composition range of each component will be described. Regarding $SiO_2$, in the case of being less than 54% (mass %, the same is applied below unless otherwise specified), the strain point is not sufficiently increased, the thermal expansion coefficient is increased and the density is increased. Thus, the content of $SiO_2$ is 54% or more. In the case where a float processing is employed as a forming method when the non-alkali glass according to the present invention is used as a substrate for a display or a substrate for a photomask, the content of $SiO_2$ is preferably 57% or more. In the case where a fusion processing is employed as the forming method, the content of $SiO_2$ is preferably 58% or more.

In the case where $SiO_2$ is more than 66%, meltability is degraded, a temperature $T_2$ at which glass viscosity reaches $10^2$ dPa·s or a temperature $T_4$ at which the glass viscosity reaches $10^4$ dPa·s are increased, and the devitrification temperature is increased. Thus, the content of $SiO_2$ is 66% or less. In the case where a float processing is employed as the forming method, the content of $SiO_2$ is preferably 63% or less. In the case where a fusion processing is employed as the forming method, the content of $SiO_2$ is preferably 65% or less.

$Al_2O_3$ suppresses phase separation of the glass, decreases the thermal expansion coefficient, and increases strain point. However, in the case of being less than 10%, these effects are not exhibited, and in addition, other components promoting expansion are relatively increased, resulting in a large thermal expansion. Thus, the content of $Al_2O_3$ is 10% or more. In the case where a float processing is employed as the forming method, the content of $Al_2O_3$ is preferably 18% or more. In the case where a fusion processing is employed as the forming method, the content of $Al_2O_3$ is preferably 14% or more.

In the case where $Al_2O_3$ is more than 27%, meltability of a glass is deteriorated or the devitrification temperature may be increased. Thus, the content of $Al_2O_3$ is 27% or less. In the case where a float processing is employed as the forming method, the content of $Al_2O_3$ is preferably 23% or less. In the case where a fusion processing is employed as the forming method, the content of $Al_2O_3$ is preferably 22% or less.

$B_2O_3$ improves melting reactivity of a glass, decreases devitrification temperature, and improves BHF resistance. However, in the case of being less than 0.2%, these effects are not sufficiently exhibited, and the strain point is excessively increased, molding into a plate may become difficult, or a problem of haze after treatment with BHF easily occurs. Thus, the content of $B_2O_3$ is 0.2% or more. It is preferably 0.3% or more, more preferably 0.5% or more, further preferably 1% or more, and particularly preferably 1.5% or more. However, in the case of being more than 5.5%, the strain point is lowered and the Young's modulus is reduced. Thus, the content of $B_2O_3$ is 5.5% or less. It is preferably 4.5% or less, more preferably 4% or less, further preferably 3.5% or less, and particularly preferably 3% or less.

Although not essential, MgO has characteristics in that expansion is not largely promoted among alkali earth metal oxides, and that the Young's modulus is increased while maintaining the density to be low. Thus, MgO may be contained in order to improve meltability. However, if MgO is excessively contained, the devitrification temperature is increased, and thus the content of MgO is set to be 10% or less. In the case where a float processing is employed as the forming method, the content of MgO is preferably 1% or more. In the case where a float processing is employed as the forming method, the content of MgO is preferably 8.5% or less. In the case where a fusion processing is employed as the forming method, the content of MgO is preferably 6% or less.

Although not essential, CaO has characteristics in that expansion is not largely promoted among alkali earth metal oxides, next to MgO, and that the Young's modulus is increased while maintaining the density to be low, and CaO also has characteristics of improving meltability. Thus, CaO may be contained. However, if CaO is excessively contained, the devitrification temperature may be increased, and phosphorus which is impurities in a limestone ($CaCO_3$) that is a CaO raw material may be largely mixed. Thus, the content of CaO is set to be 15% or less. It is preferably 12% or less. It is preferably 3% or more in order to exhibit the above characteristics.

Although not essential, SrO may be contained in order to improve meltability without increasing the devitrification temperature of a glass. However, if SrO is excessively contained, the expansion coefficient may be increased. Thus, the content of SrO is set to be 15% or less. It is preferably 10% or less, more preferably 6.5% or less, further preferably 6% or less, and still more preferably 5.5% or less.

Although not essential, BaO may be contained in order to improve meltability. However, if BaO is excessively contained, expansion of a glass excessively occurs, and the density of the glass is excessively increased. Thus, the content of BaO is set to be 15% or less. In the case where a float processing is employed as the forming method, the content of BaO is preferably 5% or less, more preferably 3% or less, and further preferably 1% or less. In the case where a fusion processing is employed as the forming method, the content of BaO is preferably 10% or less, more preferably 8% or less, further preferably 6% or less, and still more preferably 4% or less. In any case, it is more preferable that BaO is not substantially contained. Being not substantially contained means that it is not contained other than as an unavoidable impurity. In the present invention, BaO being not substantially contained means that the content of BaO is 0.15% or less, for example.

If the total content of MgO, CaO, SrO, and BaO is less than 8%, there is a tendency that photoelastic constant is increased and meltability is decreased. Thus, the total content of MgO, CaO, SrO, and BaO is 8% or more. MgO, CaO, SrO, and BaO are preferably largely contained for the purpose of decreasing photoelastic constant. Thus, the total content thereof is more preferably 10% or more, further preferably 13% or more, and particularly preferably 16% or more. If the total content thereof is more than 25%, the average thermal expansion coefficient cannot be decreased and the strain point may be decreased. Thus, the total content thereof is 25% or less. It is preferably 22% or less, and more preferably 20% or less.

In the case where a float processing is employed as the forming method, when the total content of MgO, CaO, SrO, and BaO satisfies the above range, more preferably satisfies a range of from 13 to 23%, and the following conditions are satisfied, the Young's modulus and the specific modulus can be increased and the viscous properties of a glass, particularly $T_4$, can be decreased without increasing the devitrification temperature.

MgO/(MgO+CaO+SrO+BaO) is 0.15 or more, preferably 0.20 or more, and more preferably 0.25 or more.

CaO/(MgO+CaO+SrO+BaO) is 0.60 or less, preferably 0.55 or less, and more preferably 0.50 or less.

SrO/(MgO+CaO+SrO+BaO) is 0.70 or less, preferably 0.60 or less, and more preferably 0.50 or less.

BaO/(MgO+CaO+SrO+BaO) is 0.50 or less, preferably 0.45 or less, and more preferably 0.40 or less.

In the case where a fusion processing is employed as the forming method, it is preferable that the total content of MgO, CaO, SrO, and BaO satisfies the above range, more preferably satisfies a range of from 8% to 22% and the following conditions are satisfied.

MgO/(MgO+CaO+SrO+BaO) is 0.25 or less, preferably 0.20 or less, and more preferably 0.15 or less.

CaO/(MgO+CaO+SrO+BaO) is 0.20 or more, preferably 0.30 or more, and more preferably 0.40 or more.

SrO/(MgO+CaO+SrO+BaO) is 0.50 or less, preferably 0.45 or less, and more preferably 0.40 or less.

BaO/(MgO+CaO+SrO+BaO) is 0.70 or less, preferably 0.50 or less, and more preferably 0.40 or less.

It is preferable that the glass according to the present invention does not substantially contain PbO, $As_2O_3$ and $Sb_2O_3$, in order to facilitate recycle of the glass.

Furthermore, for the similar reason, it is preferable that $P_2O_5$ content is not substantially contained. The amount as impurities is preferably 80 mass ppm or less, more preferably 70 mass ppm or less, further more preferably 60 mass ppm or less, and particularly preferably 50 mass ppm or less.

In the glass according to the present invention, alkali metal oxide is unavoidably contained as an impurity from raw material and the like, and containing the very small amount of alkali metal oxide is allowed for improving meltability. However, in the case where the content of alkali metal oxide is too large, alkali ions significantly moves into a TFT element, transistor characteristics become unstable or the reliability becomes lost. Thus, the content of alkali metal oxide is required to be suppressed to be in an appropriate range.

Because $Na_2O$ occupies a large part of the amount of alkali metal oxide which is unavoidably mixed in from a raw material, the present invention focuses on the content of $Na_2O$. In the glass according to the present invention, the content of $Na_2O$ is 600 mass ppm or less, preferably less than 600 mass ppm, more preferably 500 mass ppm or less, further preferably 400 mass ppm or less, and still more preferably 300 mass ppm or less. The content of $Na_2O$ is particularly preferably 200 ppm or less, and most preferably 150 ppm or less.

In the case where a component other than $Na_2O$ (e.g., $K_2O$) is significantly contained as alkali metal oxide which is unavoidably mixed in from raw materials (e.g., in the case where 100 mass ppm or more of the component is contained), the total content of alkali metal oxides including the component other than $Na_2O$ is preferably 700 mass ppm or less, more preferably less than 700 mass ppm, further preferably 600 mass ppm or less, still further preferably 500 mass ppm or less, and still further preferably 400 mass ppm or less. The total content thereof is particularly preferably 300 ppm or less, and most preferably 200 ppm or less.

On the other hand, alkali metal oxide in glass functions as a flux and improves initial meltability. Thus, if the content of alkali metal oxide is too small, defects may occur in a manufactured glass and quality of the glass may be degraded. In the glass according to the present invention, the content of $Na_2O$ is preferably 50 mass ppm or more, and more preferably 100 mass ppm or more.

The glass in the present invention contains the predetermined amount of $B_2O_3$, in order to improve BHF resistance.

However, in such a glass, the present inventors found that it was possible to achieve both of meltability and low thermal shrinkage properties of a glass by optimizing a ratio of $B_2O_3$ and $Na_2O$ occupying a large part of alkali metal oxides which are unavoidably mixed from raw materials. This is considered as follows.

A thermal shrinkage phenomenon results from structure relaxation occurring in the vicinity of a glass transition temperature (Tg) of the glass. In a glass containing $B_2O_3$, bonds are easily changed at Tg or higher and thus, its structure is largely changed by a fictive temperature. Therefore, it is considered that thermal shrinkage easily occurs. If a small amount of alkali ions is added to such a glass, the alkali ions easily change boron into a four-coordinate substance. Furthermore, the alkali ions have a large diffusion coefficient and thus, they easily move in comparison to an alkali earth ion. Therefore, in the case where the alkali ions are excessively contained in comparison to the amount of boron, a rate of changing the structure is increased, and as a result, thermal shrinkage largely occurs. If the mass ratio ($Na_2O/B_2O_3$) of $Na_2O$ occupying a large part of alkali metal oxides, to $B_2O_3$ is more than 0.3, such an effect is increased and the thermal shrinkage rate is unnecessarily increased.

For the above reasons, $Na_2O/B_2O_3$ is 0.3 or less. $Na_2O/B_2O_3$ is preferably 0.2 or less, more preferably 0.12 or less, further preferably 0.08 or less, still further preferably 0.06 or less, and still more preferably 0.04 or less. In the case where $Na_2O/B_2O_3$ is too small, initial meltability may be reduced, and quality may be degraded. Thus, $Na_2O/B_2O_3$ is 0.001 or more. $Na_2O/B_2O_3$ is preferably 0.002 or more, more preferably 0.003 or more, and particularly preferably 0.005 or more.

In the non-alkali glass according to the present invention, the $B_2O_3$ content is a predetermined amount. In the case where the $B_2O_3$ content is within a range of the predetermined amount, variation in the thermal shrinkage rate due to $Na_2O/B_2O_3$ becomes small. $Na_2O$ is unavoidably mixed in from a raw material, and thus strictly controlling the $Na_2O$ content is difficult. In the non-alkali glass according to the present invention, the variation in the thermal shrinkage rate due to $Na_2O/B_2O_3$ is small, and thus the variation in the thermal shrinkage rate due to the content of $Na_2O$ which is unavoidably mixed in from a raw material is small. Therefore, a probability of variation in the thermal shrinkage rate occurring among lots is suppressed.

Furthermore, in the present invention, the present inventors found that, as $B_2O_3$ is contained smaller, alkali ions are more easily diffused from a glass surface to the counterpart member side such as a TFT. That is, the present inventors found that by reducing the content of alkali ions with respect to the content of $B_2O_3$, diffusion of the alkali ions into a TFT element can be suppressed to thereby improve the characteristics of the TFT element. In order to sufficiently obtain this effect, $Na_2O/B_2O_3$ is preferably less than 0.06, more preferably 0.05 or less, further preferably 0.04 or less, still further preferably 0.02 or less, particularly preferably 0.01 or less, and most preferably 0.008 or less.

In order to improve meltability, clarity, and glass forming properties (float processing properties) of the glass, the non-alkali glass according to the present invention may contain, other than the above components, ZnO, $Fe_2O_3$, $SO_3$, F, Cl, and $SnO_2$ in a total amount of preferably 2% or less, more preferably 1% or less, further preferably 0.5% or less, and most preferably 0.1% or less. It is more preferable that $ZrO_2$ and ZnO are substantially not contained.

The non-alkali glass according to the present invention has a strain point of 680° C. or higher. In the non-alkali glass according to the present invention, since the strain point is 680° C. or higher, an occurrence of thermal shrinkage in manufacturing a panel can be suppressed. Furthermore, a method using laser annealing can be applied as a manufacturing method of a p-Si TFT. The strain point is preferably 685° C. or higher, and more preferably 690° C. or higher.

Since the strain point is 680° C. or higher, the non-alkali glass according to the present invention is suitable to a use for a high strain point (e.g., a substrate for a display or a substrate for illumination of a thin plate with a plate thickness of 0.7 mm or less, preferably 0.5 mm or less, more preferably 0.3 mm or less, and further preferably 0.1 mm or less). When a thin-plate glass is formed, a drawing-out speed in forming tends to be fast. Thus, the fictive temperature of the glass is increased, and the thermal shrinkage rate of the glass is easily increased. In this case, if the high-strain point glass according to the present invention is used, it is possible to suppress the thermal shrinkage rate.

On the other hand, in the non-alkali glass according to the present invention, the strain point is preferably 780° C. or lower. If the strain point of a non-alkali glass is too high, the temperature of a forming equipment is required to be increased in accordance therewith, and thus there is a tendency that the lifetime of the forming equipment is reduced. Thus, in the non-alkali glass according to the present invention, the strain point is more preferably 750° C. or lower, further preferably 740° C. or lower, and particularly preferably 730° C. or lower.

The non-alkali glass according to the present invention has, for the reason similar to that for the strain point, a glass transition point of preferably 730° C. or higher, more preferably 740° C. or higher, and further preferably 750° C. or higher. The glass transition point is preferably 840° C. or lower, more preferably 820° C. or lower, and further preferably 800° C. or lower.

The non-alkali glass according to the present invention has an average thermal expansion coefficient at from 50° C. to 350° C. being from $30 \times 10^{-7}$/° C. to $45 \times 10^{-7}$/° C. Thus, thermal shock resistance is increased, and it is possible to improve productivity in manufacturing a panel. In the non-alkali glass according to the present invention, the average thermal expansion coefficient at from 50° C. to 350° C. is preferably $35 \times 10^{-7}$/° C. or higher. The average thermal expansion coefficient at from 50° C. to 350° C. is preferably $43 \times 10^{-7}$/° C. or lower, more preferably $41 \times 10^{-7}$/° C. or lower, and further preferably $40 \times 10^{-7}$/° C. or lower.

Furthermore, the non-alkali glass according to the present invention has a specific gravity of preferably 2.70 or less, more preferably 2.65 or less, and further preferably 2.60 or less.

The non-alkali glass according to the present invention has a temperature $T_2$ at which viscosity reaches $10^2$ dPa·s being 1,800° C. or lower. The temperature $T_2$ is preferably 1,750° C. or lower, more preferably 1,700° C. or lower, further preferably 1,680° C. or lower, and particularly preferably 1,670° C. or lower. Thus, melting is relatively easily performed.

Furthermore, the non-alkali glass according to the present invention has a temperature $T_4$ at which viscosity reaches $10^4$ dPa·s being 1,350° C. or lower. The temperature $T_4$ is preferably 1,325° C. or lower, more preferably 1,300° C. or lower, and further preferably, lower than 1,300° C., 1,295° C. or lower or 1290° C. or lower. Such a temperature $T_4$ is preferable for float processing.

The non-alkali glass according to the present invention has a devitrification temperature of preferably 1,300° C. or lower, since forming by a float method is easily performed.

The devitrification temperature is more preferably lower than 1,300° C., further preferably 1,290° C. or lower, and most preferably 1,280° C. or lower. Furthermore, a difference ($T_4$-devitrification temperature) between the temperature $T_4$ (temperature at which glass viscosity reaches $10^4$ dPa·s, unit: ° C.) and the devitrification temperature, which provides an indication of float processing properties or fusion processing properties, is preferably −20° C. or higher, more preferably −10° C. or higher, further preferably 0° C. or higher, still further preferably 10° C. or higher, particularly preferably 20° C. or higher, and most preferably 30° C. or higher.

The devitrification temperature described in this specification is an average value between the maximum temperature at which crystals are deposited on a surface and inside of a glass and the minimum temperature at which crystals are not deposited, which are determined by putting pulverized glass particles in a platinum plate, performing heat treatment for 17 hours in an electric furnace controlled to a constant temperature, and performing optical microscopic observation after the heat treatment.

In the case where a float processing is employed as the forming method, the non-alkali glass according to the present invention has a devitrification viscous property η [dPa·s] preferably satisfying log η=3.5 or more.

In this specification, the devitrification viscous property η is a viscosity value at the devitrification temperature.

In the case where a fusion processing is employed as the forming method, the devitrification viscous property η preferably satisfies log η=4.5 [dPa·s] or more.

The non-alkali glass according to the present invention has a Young's modulus of preferably 78 GPa or more, and more preferably 79 GPa or more, 80 GPa or more, or 81 GPa or more, and further preferably 82 GPa or more.

The non-alkali glass according to the present invention has a photoelastic constant of preferably 31 nm/MPa/cm or less. There may be a case where a glass substrate has birefringence due to stress generated during a liquid crystal display panel manufacturing process or at a time of using the liquid crystal display device, resulting in a phenomenon in which black display turns to grey to decrease a contrast of the liquid crystal display. By setting the photoelastic constant to be 31 nm/MPa/cm or less, it is possible to suppress the phenomenon small. The photoelastic constant is preferably 30 nm/MPa/cm or less, more preferably 29 nm/MPa/cm or less, further preferably 28.5 nm/MPa/cm or less, and particularly preferably 28 nm/MPa/cm or less.

The non-alkali glass according to the present invention has, considering the easiness of securing other physical properties, the photoelastic constant of preferably 21 nm/MPa/cm or more, more preferably 23 nm/MPa/cm or more, and further preferably 25 nm/MPa/cm or more. The photoelastic constant can be measured at a measurement wavelength of 546 nm by means of a disk compression method.

The non-alkali glass in the present invention can be manufactured by a method as follows, for example. Raw materials of respective components, which are generally used, are blended to make target composition, are continuously put into a melting furnace and heated at from 1,500° C. to 1,800° C. to be melted. The molten glass is formed to have a predetermined plate thickness by a float method or a fusion method. After annealed, the glass is cut to thereby obtain a glass plate.

Since the glass of the present invention has relatively-low meltability, the followings are preferably used as the raw materials of the respective components.

It is preferable that the non-alkali glass of the present invention has a small shrinkage amount at the time of heat treatment. In manufacturing a liquid crystal panel, heat treatment process is different between in the array side and in the color filter side. Therefore, particularly in a high-definition panel, if the thermal shrinkage rate of the glass is large, there is a problem that dot deviation occurs at the time of fitting.

Evaluation of the thermal shrinkage rate can be performed by the following procedures. A sample is held at a temperature of a glass transition temperature +100° C. for 10 minutes, and then is cooled to room temperature at 40° C. per minute. The total length $L_1$ of the sample is measured at this time. Then, the sample is heated up to 600° C. at 100° C./hour, held at 600° C. for 80 minutes, and cooled to room temperature at 100° C./hour. Then, the total length $L_2$ of the sample is measured again.

The thermal shrinkage rate C (ppm) can be obtained by the following expression:

$$C=(L_1-L_2)/L_1 \times 10^6.$$

In the above evaluation method, the thermal shrinkage rate is preferably 90 ppm or less, more preferably 80 ppm or less, further preferably 70 ppm or less, still further preferably 60 ppm or less, and particularly preferably 50 ppm or less.

A manufacturing method for improving low thermal shrinkage rate properties may be introduced for the non-alkali glass of the present invention. Specifically, for example, an equivalent cooling rate is set to be 400° C./minute or less. Here, the definition and an evaluation method of the equivalent cooling rate are as follows.

A glass processed to have a rectangular parallelepiped of 10 mm×10 mm×1 mm is held at Tg+120° C. for five minutes by using an infrared heating-type electric furnace. Then, the glass is cooled to room temperature (25° C.). At this time, a plurality of glass samples are manufactured at a cooling rate in a range of from 1° C./minute to 1,000° C./minute.

A refractive index $n_d$ of each of these samples at d-line (wavelength of 587.6 nm) is measured by the V-block method by using KPR2000 manufactured by Shimadzu Device Corporation. The obtained $n_d$ is plotted with respect to logarithm of the cooling rate, to thereby obtain a calibration curve of $n_d$ for the cooling rate.

Then, $n_d$ of a glass which is actually manufactured through processes of melting, forming, cooling, and the like in a production line is measured by the above measurement method. A corresponding cooling rate (referred to as an equivalent cooling rate in the present invention) corresponding to the obtained $n_d$ is determined by the calibration curve.

The non-alkali glass according to the present invention can improve a transistor characteristics or reliability of a TFT manufactured on the glass substrate. The characteristics of a TFT manufactured on a glass substrate can be evaluated in the following procedure in the present invention.

(Manufacturing Method of TFT)

Figure 2:
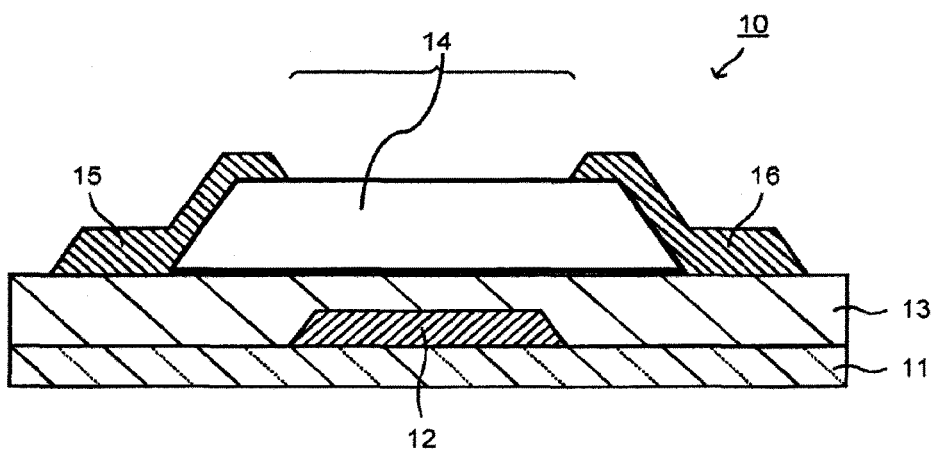
FIG. 2 is a schematic diagram illustrating a bottom gate structure.

A manufacturing method of a TFT 10 which has a bottom gate structure illustrated in FIG. 2 and is a top contact type will be described as an example. First, a film of a gate electrode 12 is formed on one main surface of a glass substrate 11. After film formation, if necessary, patterning is performed so as to provide a predetermined shape, by using a photolithography and etching method, a lift-off method, or the like. Accordingly, the gate electrode 12 is formed. The gate electrode 12 preferably has high conductivity. For example, metal such as Al or Mo can be used therefor.

After the gate electrode 12 is formed, a gate insulating layer 13 is formed on the gate electrode 12 and on an exposed surface of the glass substrate 11. After film formation, if necessary, patterning is performed so as to provide a predetermined shape, by using a photolithography and etching method, a lift-off method, or the like. Accordingly, the gate insulating layer 13 is formed. The gate insulating layer 13 preferably has high insulating property. For example, $SiO_2$, $SiN_x$, or the like can be used therefor.

After the gate insulating layer 13 is formed, an active layer 14 made of a semiconductor film is formed on the gate insulating layer 13 and at a position facing the gate electrode 12. For example, amorphous silicon, polysilicon, oxide semiconductor such as In—Ga—Zn—O, or the like can be used in the active layer 14.

After film formation, if necessary, patterning is performed so as to provide a predetermined shape, by a photolithography and etching method, a lift-off method, or the like. Then, appropriately, thermal treatment for adjusting electric resistivity and the like may be performed. After the active layer 14 is formed, a source electrode 15 and a drain electrode 16 are formed on the active layer 14 and on the exposed surface of the gate insulating layer 13. The source electrode 15 and the drain electrode 16 preferably have high conductivity. For example, metal such as Al or Mo may be used therefor.

After film formation, if necessary, patterning is performed so as to provide a predetermined shape, by a photolithography and etching method, a lift-off method, or the like. Accordingly, the source electrode 15 and the drain electrode 16 are formed. The gate electrode 12, the gate insulating layer 13, the active layer 14, the source electrode 15, and the drain electrode 16 can be formed by a dry method or a wet method. A coating method is exemplified as the wet method, and a sputtering method is exemplified as the dry method.

(Evaluation Method of TFT Characteristics)

In the present invention, the characteristics of the TFT can be evaluated by performing a current-voltage measurement on a TFT-on-glass substrate, manufactured by the above-described technique, by using a semiconductor parameter analyzer. If a current-voltage measurement is performed by a semiconductor parameter analyzer, a threshold voltage $V_{th}$ of the TFT is obtained. In this regard, when a bias voltage $V_{gs}$ is applied between the gate electrode, and the source and drain electrodes for a predetermined period, and then the current-voltage measurement is performed again, a shift of the threshold voltage $V_{th}$ is observed. The characteristics of the TFT can be evaluated by evaluating the size of the shifted amount $\Delta V_{th}$ of the threshold voltage. That is, as $\Delta V_{th}$ becomes smaller, the TFT has more excellent characteristics. In the present invention, excellent TFT characteristics include the meaning of high reliability of a TFT.

Incidentally, when a characteristic test is performed, $V_{th}$ shift of some degrees is observed regardless of an influence from the glass substrate. It is said that this is caused by injection and trapping of electrons from the semiconductor layer to the gate insulating film, and by an increase of a localized potential in the semiconductor film. This is observed as a $V_{th}$ shift in a positive direction in the case of positive bias, that is, when a positive bias voltage is applied to the gate electrode with respect to the source and drain electrode; and as a $V_{th}$ shift in a negative direction when a negative bias is applied.

As for the mechanism of shifting $V_{th}$ due to the glass substrate, It is considered that when a voltage is applied between the gate electrode, and the source and drain electrodes, alkali metal such as Na is diffused from the glass substrate into a TFT layer, and exists between the source and the drain, resulting in changing the width of a depletion layer of the TFT.

When the characteristic test is performed, the test may be performed in a state where a TFT is heated to a predetermined temperature. In this case, it is assumed that a characteristic test under higher load conditions is performed because a diffusion rate of alkali metal is increased.

In the present invention, a rising voltage $V_{on}$ defined as follows in a TFT is used as the threshold voltage $V_{th}$. That is, a gate voltage $V_{gs}$ at which a current $I_{ds}$ between the source and the drain exceeds a specific value $I_{ds0}$ in current-voltage measurement of the TFT is taken as $V_{on}$. $I_{ds0}$ may be arbitrarily selected in accordance with a W/L ratio (ratio of a channel width to a channel length) or conditions on measuring $V_{on}$. In the present invention, the rising voltage $V_{on}$ at $I_{ds0}=1\times10^{-9}$ is taken as the threshold voltage $V_{th}$. An obtaining method of $V_{th}$ is not limited to this method. For example, $V_{th}$ may be obtained by using a $\sqrt{I_{ds}}$-$V_{gs}$ method or the like.

EXAMPLES

In the following descriptions, Examples 1 to 3, 9, 11, 13, 15, 17, 19, 21, and 23 to 32 are Inventive Examples, and Examples 4 to 8, 10, 12, 14, 16, 18, 20, and 22 are Comparative Examples.

Raw materials of respective components were blended to obtain the target compositions, and melted at a temperature of from 1,550° C. to 1,650° C. by using a platinum crucible. In melting, stirring was performed by a platinum stirrer, so as to perform homogenization of a glass. Then, the molten glass was cast into a mold heated to 800° C., and the glass was cooled from a temperature which was 100° C. higher than Tg, to room temperature at 40° C./minute. Accordingly, a glass plate was obtained.

Tables 1 to 4 show the glass composition (unit: mass %), the physical property values described above, and the thermal shrinkage rate measured by the above-described procedure.

TABLE 1

| wt % | Ex. 1 | Ex. 2 | Ex. 3 | Ex. 4 | Ex. 5 | Ex. 6 | Ex. 7 | Ex. 8 |
|---|---|---|---|---|---|---|---|---|
| $SiO_2$ | 61.1 | 61.1 | 61.1 | 61.1 | 59.5 | 59.5 | 59.5 | 59.5 |
| $Al_2O_3$ | 19.7 | 19.7 | 19.7 | 19.7 | 17.2 | 17.2 | 17.2 | 17.2 |
| $B_2O_3$ | 2.6 | 2.6 | 2.6 | 2.6 | 8.1 | 8.1 | 8.1 | 8.1 |
| MgO | 5.2 | 5.2 | 5.2 | 5.2 | 3.1 | 3.1 | 3.1 | 3.1 |
| CaO | 4.4 | 4.4 | 4.4 | 4.4 | 3.8 | 3.8 | 3.8 | 3.8 |
| SrO | 7.1 | 7.1 | 7.1 | 7.1 | 8.1 | 8.1 | 8.1 | 8.1 |
| BaO | 0 | 0 | 0 | 0 | 0 | 0 | 0 | 0 |
| $Na_2O$ | 0.021 | 0.035 | 0.045 | 0.989 | 0.020 | 0.060 | 0.270 | 0.800 |
| $Na_2O/B_2O_3$ | 0.008 | 0.013 | 0.017 | 0.385 | 0.002 | 0.007 | 0.033 | 0.099 |
| MgO + CaO + SrO + BaO | 16.7 | 16.7 | 16.7 | 16.7 | 15.0 | 15.0 | 15.0 | 15.0 |

TABLE 1-continued

| wt % | Ex. 1 | Ex. 2 | Ex. 3 | Ex. 4 | Ex. 5 | Ex. 6 | Ex. 7 | Ex. 8 |
|---|---|---|---|---|---|---|---|---|
| MgO/(MgO + CaO + SrO + BaO) | 0.31 | 0.31 | 0.31 | 0.31 | 0.21 | 0.21 | 0.21 | 0.21 |
| CaO/(MgO + CaO + SrO + BaO) | 0.26 | 0.26 | 0.26 | 0.26 | 0.25 | 0.25 | 0.25 | 0.25 |
| SrO/(MgO + CaO + SrO + BaO) | 0.43 | 0.43 | 0.43 | 0.43 | 0.54 | 0.54 | 0.54 | 0.54 |
| BaO/(MgO + CaO + SrO + BaO) | 0 | 0 | 0 | 0 | 0 | 0 | 0 | 0 |
| Strain point [° C.] | 710 | 710 | 710 | 710 | 670 | 670 | 670 | 670 |
| Glass transition point [° C.] | 770 | 770 | 770 | 770 | 720 | 720 | 720 | 720 |
| Average thermal expansion coefficient α [×10$^{-7}$/° C.] | 39 | 39 | 39 | 39 | 38 | 38 | 38 | 38 |
| Specific gravity | 2.57 | 2.57 | 2.57 | 2.57 | 2.50 | 2.50 | 2.50 | 2.50 |
| $T_2$ [° C.] | 1654 | 1654 | 1654 | 1654 | 1645 | 1645 | 1645 | 1645 |
| $T_4$ [° C.] | 1298 | 1298 | 1298 | 1298 | 1275 | 1275 | 1275 | 1275 |
| Devitrification temperature [° C.] | 1240 | 1240 | 1240 | 1240 | 1270 | 1270 | 1270 | 1270 |
| Devitrification viscosity logη | 4.5 | 4.5 | 4.5 | 4.5 | 4.1 | 4.1 | 4.1 | 4.1 |
| Young's modulus [GPa] | 84 | 84 | 84 | 84 | 77 | 77 | 77 | 77 |
| Photoelastic constant [nm/MPa/cm] | 27 | 27 | 27 | 27 | 31 | 31 | 31 | 31 |
| Thermal shrinkage rate [ppm] | 43 | 45 | 47 | 97 | 126 | 136 | 165 | 220 |

TABLE 2

| wt % | Ex. 9 | Ex. 10 | Ex. 11 | Ex. 12 | Ex. 13 | Ex. 14 | Ex. 15 | Ex. 16 |
|---|---|---|---|---|---|---|---|---|
| $SiO_2$ | 61.4 | 60.8 | 63.2 | 62.5 | 58.0 | 57.4 | 64.0 | 63.4 |
| $Al_2O_3$ | 20.5 | 20.3 | 21.6 | 21.4 | 21.0 | 20.8 | 18.0 | 17.8 |
| $B_2O_3$ | 1.0 | 1.0 | 1.6 | 1.6 | 4.0 | 4.0 | 2.2 | 2.2 |
| MgO | 5.68 | 5.6 | 5.7 | 5.6 | 3.5 | 3.5 | 4.0 | 4.0 |
| CaO | 4.47 | 4.4 | 7.9 | 7.8 | 10.0 | 9.9 | 5.5 | 5.4 |
| SrO | 6.9 | 6.8 | 0 | 0 | 1.0 | 1.0 | 6.3 | 6.2 |
| BaO | 0 | 0 | 0 | 0 | 2.5 | 2.5 | 0 | 0 |
| $Na_2O$ | 0.060 | 1.000 | 0.050 | 1.000 | 0.020 | 1.000 | 0.030 | 1.000 |
| $Na_2O/B_2O_3$ | 0.060 | 1.010 | 0.031 | 0.616 | 0.005 | 0.253 | 0.014 | 0.459 |
| MgO + CaO + SrO + BaO | 17.1 | 16.9 | 13.6 | 13.5 | 17.0 | 16.8 | 15.8 | 15.6 |
| MgO/(MgO + CaO + SrO + BaO) | 0.33 | 0.33 | 0.42 | 0.42 | 0.21 | 0.21 | 0.25 | 0.25 |
| CaO/(MgO + CaO + SrO + BaO) | 0.26 | 0.26 | 0.58 | 0.58 | 0.59 | 0.59 | 0.35 | 0.35 |
| SrO/(MgO + CaO + SrO + BaO) | 0.40 | 0.40 | 0 | 0 | 0.06 | 0.06 | 0.40 | 0.40 |
| BaO/(MgO + CaO + SrO + BaO) | 0 | 0 | 0 | 0 | 0.15 | 0.15 | 0 | 0 |
| Strain point [° C.] | 720 | (700) | 733 | (713) | 704 | (684) | (722) | (702) |
| Glass transition point [° C.] | 770 | (750) | 783 | 767 | 760 | 732 | 776 | (756) |
| Average thermal expansion coefficient α [×10$^{-7}$/° C.] | 39 | (39) | 38 | 40 | 41 | 44 | 38 | (38) |
| Specific gravity | 2.60 | (2.60) | 2.50 | 2.51 | 2.57 | 2.56 | 2.53 | (2.54) |
| $T_2$ [° C.] | 1648 | (1638) | 1647 | (1637) | 1589 | (1579) | (1695) | (1685) |
| $T_4$ [° C.] | 1295 | (1280) | 1301 | (1286) | 1253 | (1238) | (1322) | (1307) |
| Devitrification temperature [° C.] | 1275 | — | — | — | 1275 | — | — | — |
| Devitrification viscosity logη | 4.2 | — | — | — | 3.8 | — | — | — |
| Young's modulus [GPa] | 87 | (86) | 91 | 89 | 85 | 85 | 85 | (83) |
| Photoelastic constant [nm/MPa/cm] | 27 | — | — | — | 27 | — | — | — |
| Thermal shrinkage rate [ppm] | 36 | (110) | 28 | (100) | 70 | (140) | 31 | (110) |

TABLE 3

| wt % | Ex. 17 | Ex. 18 | Ex. 19 | Ex. 20 | Ex. 21 | Ex. 22 | Ex. 23 | Ex. 24 |
|---|---|---|---|---|---|---|---|---|
| $SiO_2$ | 62.5 | 61.9 | 62.5 | 61.9 | 56.0 | 55.4 | 62.0 | 61.0 |
| $Al_2O_3$ | 15.5 | 15.3 | 19.5 | 19.3 | 23.0 | 22.8 | 19.0 | 18.6 |
| $B_2O_3$ | 3.0 | 3.0 | 0.5 | 0.5 | 3.0 | 3.0 | 1.2 | 3.4 |
| MgO | 5.5 | 5.4 | 8.0 | 7.9 | 3.0 | 3.0 | 3.2 | 2.0 |
| CaO | 8.5 | 8.4 | 6.0 | 5.9 | 4.0 | 4.0 | 7.0 | 8.5 |
| SrO | 5.0 | 5.0 | 2.5 | 2.5 | 8.0 | 7.9 | 3.8 | 4.5 |
| BaO | 0 | 0 | 1.0 | 1.0 | 3.0 | 3.0 | 3.8 | 2.0 |
| $Na_2O$ | 0.050 | 1.000 | 0.050 | 1.000 | 0.030 | 1.000 | 0.005 | 0.020 |
| $Na_2O/B_2O_3$ | 0.017 | 0.337 | 0.100 | 2.020 | 0.010 | 0.337 | 0.004 | 0.006 |
| MgO + CaO + SrO + BaO | 19.0 | 18.8 | 17.5 | 17.3 | 18.0 | 17.8 | 17.8 | 17.0 |
| MgO/(MgO + CaO + SrO + BaO) | 0.29 | 0.29 | 0.46 | 0.46 | 0.17 | 0.17 | 0.18 | 0.12 |

TABLE 3-continued

| wt % | Ex. 17 | Ex. 18 | Ex. 19 | Ex. 20 | Ex. 21 | Ex. 22 | Ex. 23 | Ex. 24 |
|---|---|---|---|---|---|---|---|---|
| CaO/(MgO + CaO + SrO + BaO) | 0.45 | 0.45 | 0.34 | 0.34 | 0.22 | 0.22 | 0.39 | 0.50 |
| SrO/(MgO + CaO + SrO + BaO) | 0.26 | 0.26 | 0.14 | 0.14 | 0.44 | 0.44 | 0.21 | 0.26 |
| BaO/(MgO + CaO + SrO + BaO) | 0 | 0 | 0.06 | 0.06 | 0.17 | 0.17 | 0.21 | 0.12 |
| Strain point [° C.] | (702) | (682) | (729) | (709) | (719) | (699) | (732) | (712) |
| Glass transition point [° C.] | 738 | (718) | 780 | (760) | (780) | (760) | (784) | (763) |
| Average thermal expansion coefficient α [×10$^{-7}$/° C.] | 44 | (44) | 40 | (40) | (41) | (41) | (41) | (41) |
| Specific gravity | 2.56 | (2.57) | 2.57 | (2.57) | 2.62 | (2.62) | (2.59) | (2.56) |
| $T_2$ [° C.] | (1617) | (1607) | (1620) | (1610) | (1653) | (1643) | (1694) | (1674) |
| $T_4$ [° C.] | (1261) | (1246) | (1277) | (1262) | (1305) | (1290) | (1326) | (1305) |
| Devitrification temperature [° C.] | — | — | — | — | — | — | — | — |
| Devitrification viscosity logη | — | — | — | — | — | — | — | — |
| Young's modulus [GPa] | 86 | (85) | 91 | (90) | 86 | (84) | (84) | (82) |
| Photoelastic constant [nm/MPa/cm] | — | — | — | — | — | — | — | — |
| Thermal shrinkage rate [ppm] | 75 | (140) | 35 | (110) | (50) | (120) | (40) | (50) |

TABLE 4

| wt % | Ex. 25 | Ex. 26 | Ex. 27 | Ex. 28 | Ex. 29 | Ex. 30 | Ex. 31 | Ex. 32 |
|---|---|---|---|---|---|---|---|---|
| $SiO_2$ | 63.2 | 61.0 | 63.0 | 63.8 | 62.0 | 61.0 | 61.7 | 60.2 |
| $Al_2O_3$ | 18.0 | 19.0 | 17.0 | 18.0 | 19.5 | 21.0 | 18.0 | 21.0 |
| $B_2O_3$ | 3.5 | 3.0 | 3.0 | 3.7 | 2.0 | 2.5 | 2.0 | 2.6 |
| MgO | 2.0 | 3.5 | 3.2 | 1.5 | 3.0 | 3.0 | 4.3 | 2.3 |
| CaO | 4.0 | 4.5 | 4.8 | 3.5 | 10.5 | 5.0 | 11.0 | 6.3 |
| SrO | 8.0 | 4.5 | 1.5 | 1.5 | 2.0 | 3.0 | 2.0 | 4.3 |
| BaO | 1.3 | 4.5 | 7.5 | 8.0 | 1.0 | 4.5 | 1.0 | 3.3 |
| $Na_2O$ | 0.020 | 0.020 | 0.020 | 0.020 | 0.020 | 0.020 | 0.020 | 0.020 |
| $Na_2O/B_2O_3$ | 0.006 | 0.007 | 0.007 | 0.005 | 0.010 | 0.008 | 0.010 | 0.008 |
| MgO + CaO + SrO + BaO | 15.3 | 17.0 | 17.0 | 14.5 | 16.5 | 15.5 | 18.3 | 16.2 |
| MgO/(MgO + CaO + SrO + BaO) | 0.13 | 0.21 | 0.19 | 0.10 | 0.18 | 0.19 | 0.23 | 0.14 |
| CaO/(MgO + CaO + SrO + BaO) | 0.26 | 0.26 | 0.28 | 0.24 | 0.64 | 0.32 | 0.60 | 0.39 |
| SrO/(MgO + CaO + SrO + BaO) | 0.52 | 0.26 | 0.09 | 0.10 | 0.12 | 0.19 | 0.11 | 0.27 |
| BaO/(MgO + CaO + SrO + BaO) | 0.08 | 0.26 | 0.44 | 0.55 | 0.06 | 0.29 | 0.05 | 0.20 |
| Strain point [° C.] | (715) | (717) | (718) | (721) | (724) | (728) | (716) | (725) |
| Glass transition point [° C.] | (769) | (771) | (768) | (774) | (774) | (784) | (764) | (781) |
| Average thermal expansion coefficient α [×10$^{-7}$/° C.] | (37) | (38) | (38) | (34) | (41) | (37) | (44) | (39) |
| Specific gravity | (2.54) | (2.57) | (2.57) | (2.53) | (2.55) | (2.56) | (2.57) | (2.57) |
| $T_2$ [° C.] | (1735) | (1696) | (1729) | (1786) | (1656) | (1709) | (1622) | (1694) |
| $T_4$ [° C.] | (1348) | (1324) | (1342) | (1381) | (1296) | (1337) | (1270) | (1327) |
| Devitrification temperature [° C.] | — | — | — | — | — | — | — | — |
| Devitrification viscosity logη | — | — | — | — | — | — | — | — |
| Young's modulus [GPa] | (79) | (82) | (80) | (77) | (85) | (83) | (86) | (83) |
| Photoelastic constant [nm/MPa/cm] | — | — | — | — | — | — | — | — |
| Thermal shrinkage rate [ppm] | (40) | (40) | (40) | (40) | (40) | (40) | (40) | (40) |

As is clear from Tables 1 to 4, in Examples 5 to 8 in which the $B_2O_3$ content was more than 5.5%, and Examples 4, 10, 12, 14, 16, 18, 20, 22, and 23 to 32 in which the content of $Na_2O$ was more than 600 ppm, the thermal shrinkage rate was more than 90 ppm. The thermal shrinkage rate was increased in accordance with $Na_2O/B_2O_3$. In Examples 1 to 3, 9, 11, 13, 15, 17, 19, and 21, in which the $B_2O_3$ content was from 0.2% to 5.5%, the content of $Na_2O$ is 600 ppm or less, and $Na_2O/B_2O_3$ is from 0.001 to 0.3, in any example, the thermal shrinkage rate is 90 ppm or less though the thermal shrinkage rate was increased in accordance with $Na_2O/B_2O_3$.

FIG. 1 is a graph illustrating a relationship between $Na_2O/B_2O_3$ and the thermal shrinkage rate. As for the thermal shrinkage rate C, a value obtained by extrapolating 0 to a regression line obtained by the least square method was taken as $C_0$, and a value ($C/C_0$) obtained by dividing the thermal shrinkage rate of each glass by $C_0$ is indicated. This plot indicates variation of the thermal shrinkage rate depending on $Na_2O/B_2O_3$. As shown in FIG. 1, in Examples 1 to 4 in which the $B_2O_3$ content is from 0.2% to 5.5%, an inclination of a straight line indicating the variation of the thermal shrinkage rate is about 1/2 of that in Examples 5 to 8 in which the $B_2O_3$ content is more than 5.5% (here, Example 4 corresponds to a Comparative Example because $Na_2O$ was more than 600 ppm). Accordingly, in the non-alkali glass according to the present invention, the variation of the thermal shrinkage rate due to the content of $Na_2O$ occupying a large part of alkali metal oxide which is unavoidably mixed from a raw material is reduced, and the thermal shrinkage rate is also reduced.

Figure 3:
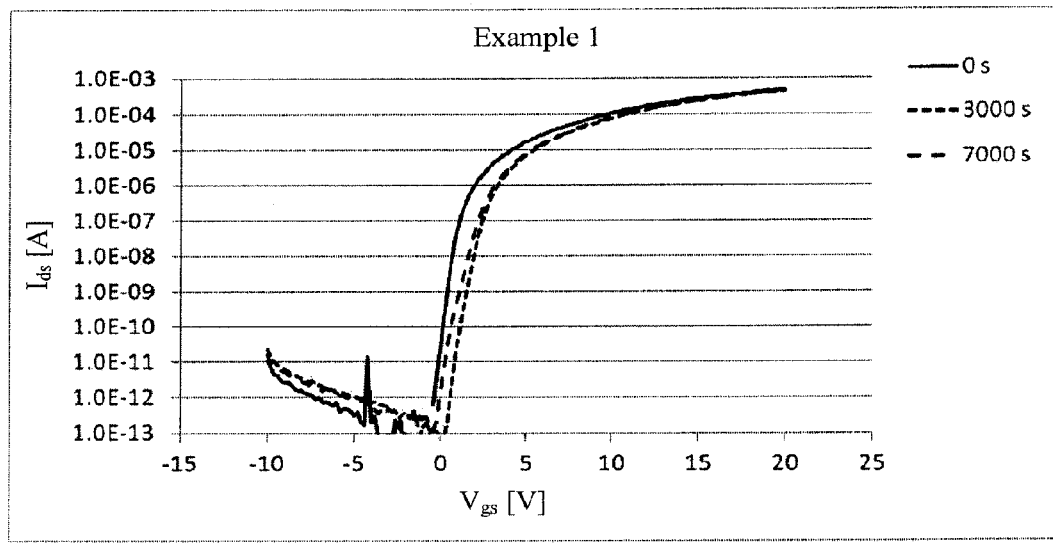
FIG. 3 illustrates a result obtained by performing a characteristic test of a TFT in Example 1.
Figure 4:
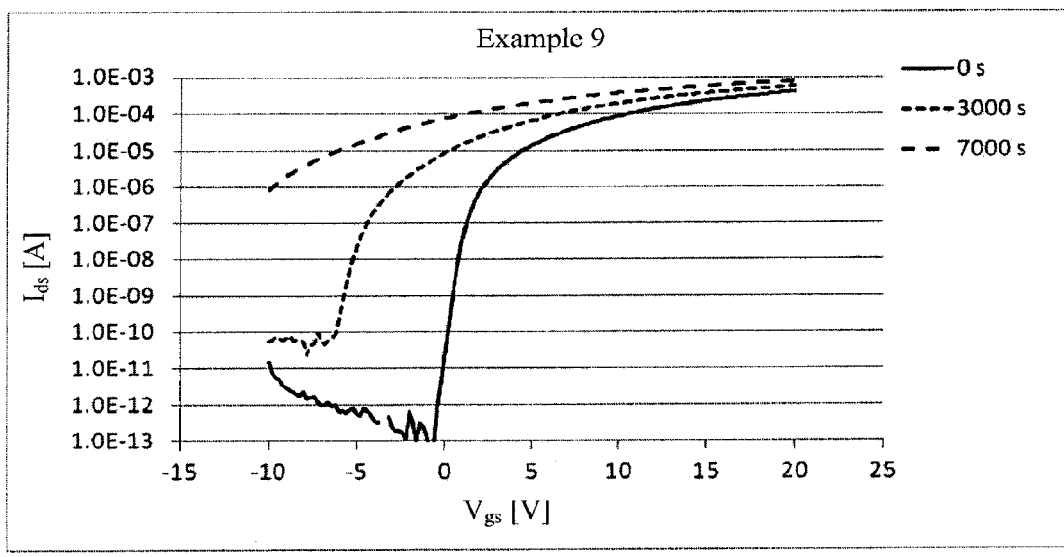
FIG. 4 illustrates a result obtained by performing a characteristic test of a TFT in Example 9.
Figure 5:
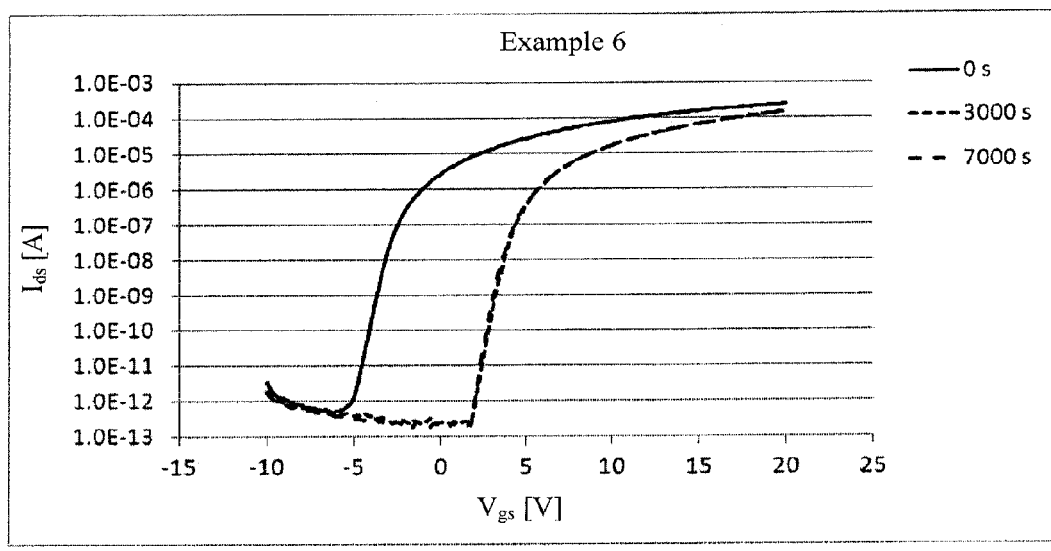
FIG. 5 illustrates a result obtained by performing a characteristic test of a TFT in Example 6.

FIGS. 3, 4, and 5 show results obtained by performing the characteristic test of a TFT in Examples 1, 9, and 6, respectively. A glass plate manufactured by the above procedure was processed so as to have a size of 40 mm square and 0.5 mm thickness, and the processed plate was used as the glass substrate. A TFT was manufactured by the above method. Mo having a film thickness of 100 nm was used as the gate electrode. $SiO_2$ having a film thickness of 200 nm was used as the gate insulating film. In—Ga—Zn—O having a film thickness of 35 nm was used as the semiconductor layer. Mo having a film thickness of 100 nm was used as the source and drain electrodes.

A TFT in which the width of the source and drain electrodes, that is, the channel width was 300 μm, and a gap between the source and drain electrodes, that is, the channel length was 50 μm was formed. The characteristics of the TFT were evaluated by the above method. B1500A manufactured by Keysight Technologies Corporation was used as the semiconductor parameter analyzer. Regarding current-voltage measurement, a drain current $I_{ds}$ was observed at atmospheric pressure, an air atmosphere, at 70° C., under a shading environment, when the source-drain voltage $V_{ds}$ was set to 10 V and the gate voltage $V_{gs}$ was changed from −10 V to 20 V. A positive bias voltage $V_{gs}$ of 10 V was applied to the gate electrode with respect to the source-drain electrodes for 0 second, 3,000 seconds, and 7,000 seconds, and then current-voltage measurement was performed, and it was observed whether or not the threshold voltage $V_{th}$ was shifted.

As is clear from FIG. 3, in Example 1 in which $Na_2O/B_2O_3$ is 0.001 or more and less than 0.06, it is understood that the shifted amount of $V_{th}$ is small, $V_{th}$ is shifted in the positive direction regarding applying a positive bias voltage, and a TFT has excellent characteristics.

Regarding Example 9 in which $Na_2O/B_2O_3$ is 0.06 or more, from FIG. 4, $V_{th}$ is shifted in the negative direction and thus, it is considered that alkali ions are diffused in a TFT by the characteristic test and influences the TFT easier than that in FIG. 3.

As is clear from FIG. 5, in Example 6, the content of $Na_2O$ is the same as that in Example 9 but $Na_2O/B_2O_3$ is 0.001 or more and less than 0.06, and thus a TFT has excellent characteristics. Thus, in order to improve the characteristics of a TFT manufactured on a glass substrate, it is effective that not $Na_2O$ is simply reduced, but $Na_2O/B_2O_3$ is reduced, particularly, in a state in which the $B_2O_3$ is 5.5% or less.

The present invention has been described in detail with reference to specific embodiments thereof, but it will be apparent to one skilled in the art that various changes and modifications can be made without departing from the intention and scope of the present invention. The present application is based on Japanese Patent Application (No. 2014-216174) filed on Oct. 23, 2014, the contents of which are incorporated herein by reference.

What is claimed is:

1. A non-alkali glass having a strain point of 680° C. or higher, having an average the thermal expansion coefficient of from $30\times10^{-7}$/° C. to $43\times10^{-7}$/° C. at from 50° C. to 350° C., comprising, indicated by mass % on the basis of oxides:
   $SiO_2$: 54% to 66%,
   $Al_2O_3$: 10% to 27%,
   $B_2O_3$: 0.2% to 5.5%,
   MgO: 0% to 10%,
   CaO: 0% to 15%,
   SrO: 0% to 15%,
   BaO: 0% to 15%, and
   MgO+CaO+SrO+BaO: 8% to 25%,
   comprising 600 mass ppm or less of $Na_2O$, and
   satisfying a mass ratio ($Na_2O/B_2O_3$) between $Na_2O$ and $B_2O_3$ being from 0.001 to 0.3.

2. The non-alkali glass according to claim 1, having a devitrification viscous property η satisfying log η=3.5 [dPa·s] or more, comprising, indicated by mass % on the basis of oxides:
   $SiO_2$: 57% to 63%,
   $Al_2O_3$: 18% to 23%,
   $B_2O_3$: 0.2% to 5.5%,
   MgO: 1% to 8.5%,
   CaO: 3% to 12%,
   SrO: 0% to 10%,
   BaO: 0% to 5%, and
   MgO+CaO+SrO+BaO: 13% to 23%, and
   satisfying:
   MgO/(MgO+CaO+SrO+BaO) being 0.15 or more,
   CaO/(MgO+CaO+SrO+BaO) being 0.60 or less,
   SrO/(MgO+CaO+SrO+BaO) being 0.70 or less, and
   BaO/(MgO+CaO+SrO+BaO) being 0.50 or less.

3. The non-alkali glass according to claim 1, having a devitrification viscous property η satisfying log η=4.5 [dPa·s] or more, comprising, indicated by mass % on the basis of oxides:
   $SiO_2$: 58% to 65%,
   $Al_2O_3$: 14% to 22%,
   $B_2O_3$: 0.2% to 5.5%,
   MgO: 0% to 6%,
   CaO: 3% to 12%,
   SrO: 0% to 10%,
   BaO: 0% to 10%, and
   MgO+CaO+SrO+BaO: 8% to 22%, and
   satisfying:
   MgO/(MgO+CaO+SrO+BaO) being 0.25 or less,
   CaO/(MgO±CaO+SrO+BaO) being 0.20 or more,
   SrO/(MgO+CaO+SrO+BaO) being 0.50 or less, and
   BaO/(MgO±CaO+SrO+BaO) being 0.70 or less.

4. The non-alkali glass according to claim 1, wherein the mass ratio ($Na_2O/B_2O_3$) between $Na_2O$ and $B_2O_3$ is 0.001 or more and less than 0.06.

5. The non-alkali glass according to claim 1, having a strain point of 680° C. to 780° C.

6. The non-alkali glass according to claim 1, having a strain point of 690° C. to 730° C.

7. The non-alkali glass according to claim 1, having an average thermal expansion coefficient of from $35\times10^{-7}$/° C. to $40\times10^{-7}$/° C.

8. The non-alkali glass according to claim 1, having a thermal shrinkage rate of 90 ppm or less.

9. The non-alkali glass according to claim 1, obtained by cooling at an equivalent cooling rate of 400° C./minute or less.

10. A thin film transistor, comprising the non-alkali glass according to claim 1.

11. A thin film transistor, comprising the non-alkali glass according to claim 2.

12. A thin film transistor, comprising the non-alkali glass according to claim 3.

13. A thin film transistor, comprising the non-alkali glass according to claim 8.

14. A thin film transistor, comprising the non-alkali glass according to claim 9.

15. A thin film transistor, comprising the non-alkali glass according to claim 4.

16. A thin film transistor, comprising the non-alkali glass according to claim 5.

17. A thin film transistor, comprising the non-alkali glass according to claim 6.

18. A thin film transistor, comprising the non-alkali glass according to claim 7.

* * * * *